(12) United States Patent
Trasatti et al.

(10) Patent No.: US 6,449,248 B1
(45) Date of Patent: Sep. 10, 2002

(54) METHOD TO INCREASE BANDWIDTH OF A CLUSTER SYSTEM

(75) Inventors: Philip J. Trasatti, Brookline; Bruce E. Mann, Mason, both of NH (US)

(73) Assignee: Seachange International, Inc., Maynard, MA (US)

( * ) Notice: Subject to any disclaimer, the term of this patent is extended or adjusted under 35 U.S.C. 154(b) by 0 days.

(21) Appl. No.: 09/613,391

(22) Filed: Jul. 11, 2000

(51) Int. Cl.[7] ............................................... G06F 12/00

(52) U.S. Cl. ....................................................... 370/216

(58) Field of Search ........................ 370/216; 348/282; 711/114; 707/202

(56) References Cited

U.S. PATENT DOCUMENTS

| | | | | |
|---|---|---|---|---|
| 4,237,477 A | * | 12/1980 | Weimer | ...................... 348/282 |
| 5,583,995 A | | 12/1996 | Gardner et al. | |
| 6,012,123 A | * | 1/2000 | Pecone et al. | ............... 711/114 |
| 6,138,125 A | * | 10/2000 | DeMoss | ...................... 707/202 |

* cited by examiner

*Primary Examiner*—Salvatore Cangialosi
(74) *Attorney, Agent, or Firm*—Fish & Richardson P.C.

(57) ABSTRACT

A method for increasing service bandwidth in a cluster system having at least three nodes is described. The method includes storing data according to a distributed, redundant process, skipping one remote node when redundant data is stored on a reading node, and reading data from the cluster system using a stripe row reading process by applying an XOR operation to the redundant portion stored on the reading node.

11 Claims, 4 Drawing Sheets

80

XOR READ METHOD CLUSTER PERFORMANCE WITH ONE CLUSTER CONTROLLER

| MEDIA CLUSTER NODE COUNT | NETWORK LINK COUNT | NETWORK BANDWIDTH | LOCAL DISK BANDWIDTH | MAXIMUM SERVICE BANDWIDTH |
|---|---|---|---|---|
| 3 | 2 | 20 MB/SEC | 20 MB/SEC | 40 MB/SEC |
| 4 | 3 | 30 MB/SEC | 15 MB/SEC | 45 MB/SEC |
| 5 | 4 | 40 MB/SEC | 13.3 MB/SEC | 53.3 MB/SEC |
| 6 | 5 | 50 MB/SEC | 12.5 MB/SEC | 62.5 MB/SEC |
| 7 | 6 | 60 MB/SEC | 12 MB/SEC | 72 MB/SEC |

| NODE 0 | NODE 1 | NODE 2 |
|---|---|---|
| PARITYBLOCK[0,1] | DATABLOCK[0] | DATABLOCK[1] |
| DATABLOCK[2] | PARITYBLOCK[2,3] | DATABLOCK[3] |
| DATABLOCK[4] | DATABLOCK[5] | PARITYBLOCK[4,5] |
| PARITYBLOCK[6,7] | DATABLOCK[6] | DATABLOCK[7] |
| DATABLOCK[8] | PARITYBLOCK[8,9] | DATABLOCK[9] |
| DATABLOCK[10] | DATABLOCK[11] | PARITYBLOCK[10,11] |
| PARITYBLOCK[12,13] | DATABLOCK[12] | DATABLOCK[13] |
| DATABLOCK[14] | PARITYBLOCK[14,15] | DATABLOCK[15] |
| DATABLOCK[16] | DATABLOCK[17] | PARITYBLOCK[16,17] |

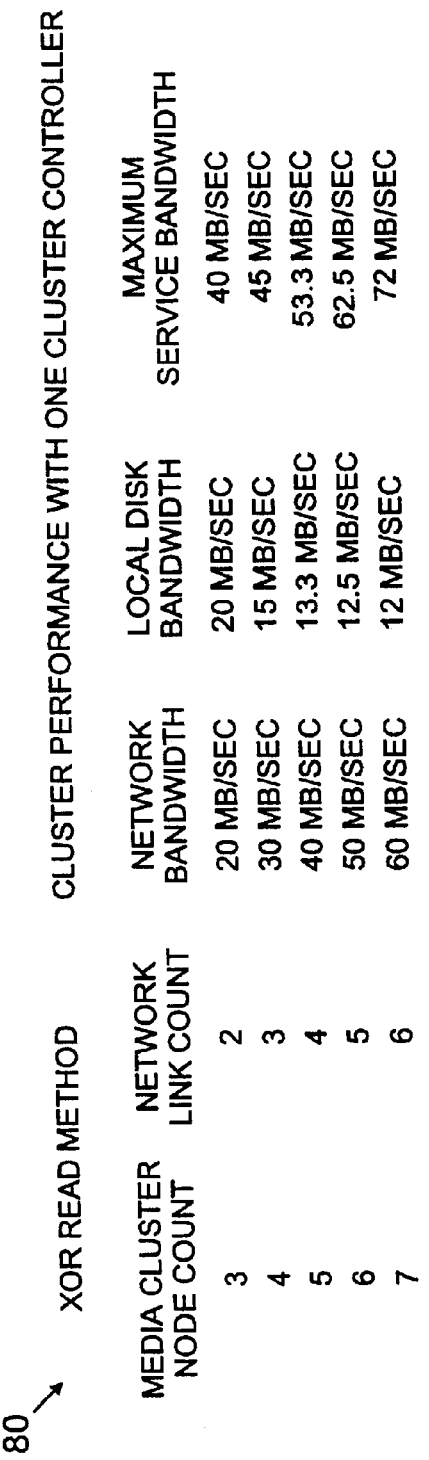

FIG. 7

| CLUSTER SIZE | LOCAL READ W/O XOR | REMOTE READ W/O XOR | LOCAL READ W/ XOR | REMOTE READ W/ XOR |
|---|---|---|---|---|
| 3 | 1/3 | 2/3 | 1/2 | 1/2 |
| 4 | 1/4 | 3/4 | 1/3 | 2/3 |
| 5 | 1/5 | 4/5 | 1/4 | 3/4 |
| 6 | 1/6 | 5/6 | 1/5 | 4/5 |
| 7 | 1/7 | 6/7 | 1/6 | 5/6 |

70 — CLUSTER LOCAL TO REMOTE DATA SOURCE PERCENTAGES

FIG. 8

80 — CLUSTER PERFORMANCE WITH ONE CLUSTER CONTROLLER

| MEDIA CLUSTER NODE COUNT | XOR READ METHOD NETWORK LINK COUNT | NETWORK BANDWIDTH | LOCAL DISK BANDWIDTH | MAXIMUM SERVICE BANDWIDTH |
|---|---|---|---|---|
| 3 | 2 | 20 MB/SEC | 20 MB/SEC | 40 MB/SEC |
| 4 | 3 | 30 MB/SEC | 15 MB/SEC | 45 MB/SEC |
| 5 | 4 | 40 MB/SEC | 13.3 MB/SEC | 53.3 MB/SEC |
| 6 | 5 | 50 MB/SEC | 12.5 MB/SEC | 62.5 MB/SEC |
| 7 | 6 | 60 MB/SEC | 12 MB/SEC | 72 MB/SEC |

METHOD TO INCREASE BANDWIDTH OF A CLUSTER SYSTEM

TECHNICAL FIELD

This invention relates to a cluster system, and more particularly to a method for increasing the bandwidth of such a system.

BACKGROUND

A cluster system may combine, for example, three to five processors (or nodes) that are interconnected via a fast ethernet topology to deliver high resolution digital video streams as a single video delivery system. The cluster system architecture provides access to video streams as data objects, with each node capable of managing its own file system and the cluster-wide file system. The nodes are typically loosely coupled and have data objects striped across the cluster system. In an implementation, the data objects are fragmented and written to the nodes of the cluster using RAID-5 striping and parity techniques. Thus, if one node fails, then the cluster system can recreate any lost data from the parity data using an EXCLUSIVE-OR (XOR) operation and continue to operate without an interruption of service. The XOR method is a logical operation that may be applied to binary data.

Computer programs in a cluster system use application programming interfaces (APIs) to record and playback media files from specialized media hardware interfaces. The media data streaming through these special hardware interfaces is known as service bandwidth. Service bandwidth may be defined as the rate at which data is being delivered from a node to an external system.

The cluster system storage capacity and service bandwidth capacity can each be scaled up by adding disks to each node in the cluster, and/or by adding additional nodes to the cluster system. As each new node is added, any media content on the newly-added node is added (merged) into the on-line cluster system inventory. However, a need exists to inexpensively provide greater service bandwidth.

SUMMARY

Presented is a method for increasing service bandwidth in a cluster system having at least three nodes. The method includes storing data according to a distributed, redundant process, skipping one remote node when redundant data is stored on a reading node, and reading data from the cluster system using a stripe row reading process by applying an XOR operation to the redundant portion stored on the reading node.

The method may include one or more of the following features. A different node may be skipped each time the XOR operation is used to balance the read operation. Each portion of the redundant data may be stored in a round-robin manner in each node of the cluster system. The method may be disabled if one of the nodes fails.

Another implementation of the invention is a technique for operating a cluster system having at least three nodes to increase the service bandwidth when operating in a non-degraded mode. The technique includes storing data input according to a distributed, redundant storage process with data stored at each node and a portion of a redundant representation of the data stored at each node, skipping one remote node when redundant data is stored on a reading node, and reading data from the cluster system using a stripe row read process by applying an XOR operation to the redundant portion stored on the reading node.

The technique may include one or more of the following features. A different node may be skipped each time the XOR operation is used to balance the read operation. Each portion of the redundant data may be stored in a round-robin manner in each node of the cluster system.

An article including a computer readable medium which stores computer executable instructions for increasing the service bandwidth of a computer cluster system that includes at least three nodes is also presented. The instructions cause the cluster system to store data input according to a distributed, redundant storage process so that data is stored at each node and a portion of a redundant representation of the data is stored at each node, to skip one remote node when redundant data is stored on a reading node and none of the nodes has failed, and to read data from the cluster system using a stripe row read process by applying an XOR operation to the redundant portion stored on the reading node. The article may include one or more of the following features. The instructions may further cause the cluster system to skip a different node each time the XOR operation is used to balance the read operation. The instructions may cause each portion of the redundant data to be stored in a round-robin manner in each node of the cluster system. The instructions may further cause the method to be disabled if one of the nodes fails.

Use of the invention is advantageous because less data from remote cluster nodes must be accessed for the same service load, resulting in a reduction of the network bandwidth required. Since the network bandwidth requirement is reduced, more data can be transferred and a greater service load delivered.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 7 is a table comparing the cluster local read and remote read data source percentages in conventional cluster systems of different sizes to the local read and remote read data source percentages of systems of different sizes that are utilizing a method according to the invention.

FIG. 8 is a table illustrating the maximum service bandwidth for different cluster sizes that utilize a method according to the invention.

Like reference symbols in the various drawings indicate like elements.

DETAILED DESCRIPTION

Figure 1:
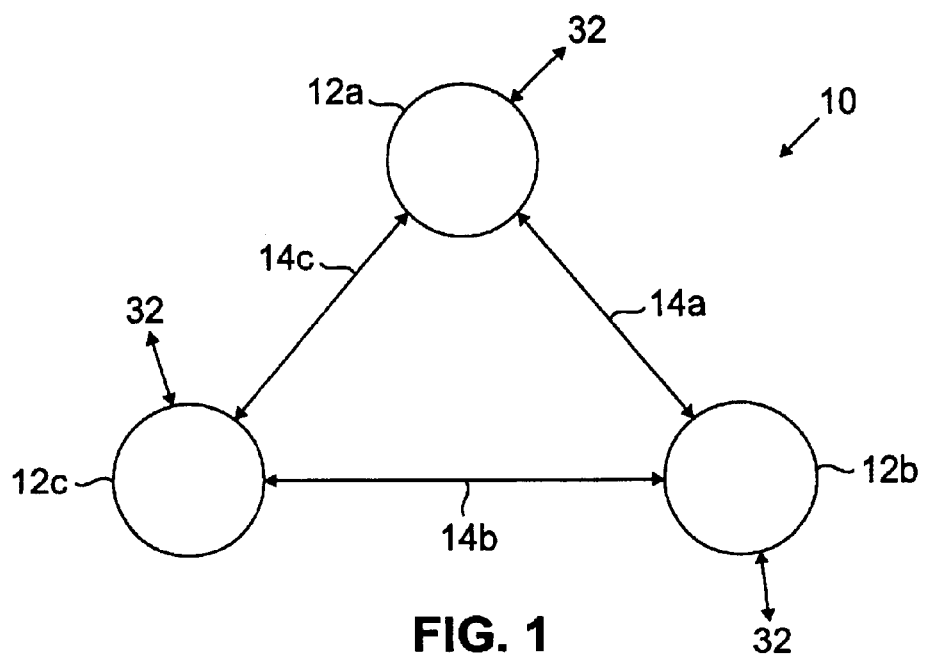
FIG. 1 is an implementation of a cluster system that may utilize a method according to the invention.

FIG. 1 illustrates an implementation of a redundant distributed computer system or cluster system 10 having three processor systems 12a, 12b and 12c. In this example, each processor system or node is interconnected by channels 14a, 14b and 14c in a point to point configuration. Any other interconnection that is equivalent to a point to point connection, or that otherwise meets uniform node to node transfer bandwidth and latency requirements could be used. In addition, other implementations may use many more nodes to form a cluster system.

Figure 2:
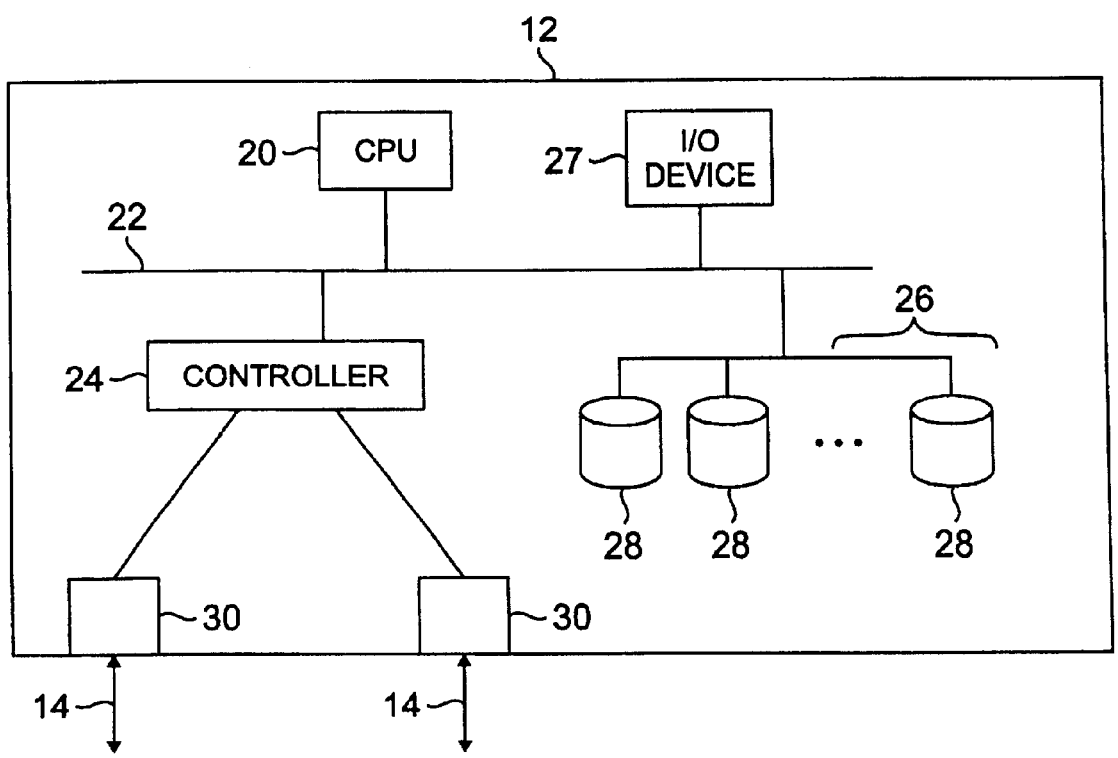
FIG. 2 is an implementation of a node of FIG. 1.

FIG. 2 illustrates details of an implementation of one node or processor system 12 of FIG. 1. In particular, each node 12 of the cluster system has a central processing unit (CPU) 20 connected to an internal data communications bus 22, to which are connected at least a memory and communications controller 24, a mass memory storage unit 26 and an input/output device 27. The mass storage unit typically has a plurality of disk drive units 28. Controller 24 is also connected to two channel interface units 30, each of which is connected to a different interconnecting channel 14 for establishing communications with the other nodes through their respective channel interface units 30.

The interconnecting channels 14 may use a protocol running on, for example, Fast Ethernet datalink devices. This protocol provides a relatively high efficiency and enables communications between processors, in the illustrated embodiment, at a bandwidth on the order of 100 megabits/sec. Accordingly, referring to FIG. 1, each node 12 is connected to two interconnecting channels, and has a bandwidth to the external node memories of approximately 200 megabits/sec. (less overhead), in addition to its own capabilities with regard to its local mass storage 26.

In one particular application of the cluster system illustrated in FIG. 1, video input data is provided to one or more nodes 12 over external feedlines, for example, network feeds 32 which require high bandwidth storage of the substantial data needed to represent and store even small durations of video data (including audio). In particular, for example, one minute of video data can require sixty-six megabytes of storage. The particular implementation described herein and shown in FIG. 1 has substantial bandwidth to enable the video data to be distributed among the various nodes so that the video data input to one of the nodes is actually stored by each of the processor systems 12. The controllers 24 of the nodes individually and collectively act to store data across the entire cluster computer system 10 in a redundant fashion so that if any one node fails the remaining nodes can nevertheless reconstruct all the data stored in the entire system. This approach will be described in more detail below, and provides load balancing across the various processing systems and enables any one node, requiring either to read or write data, the capability of a very large bandwidth memory communication channel.

Figures 3, 4:
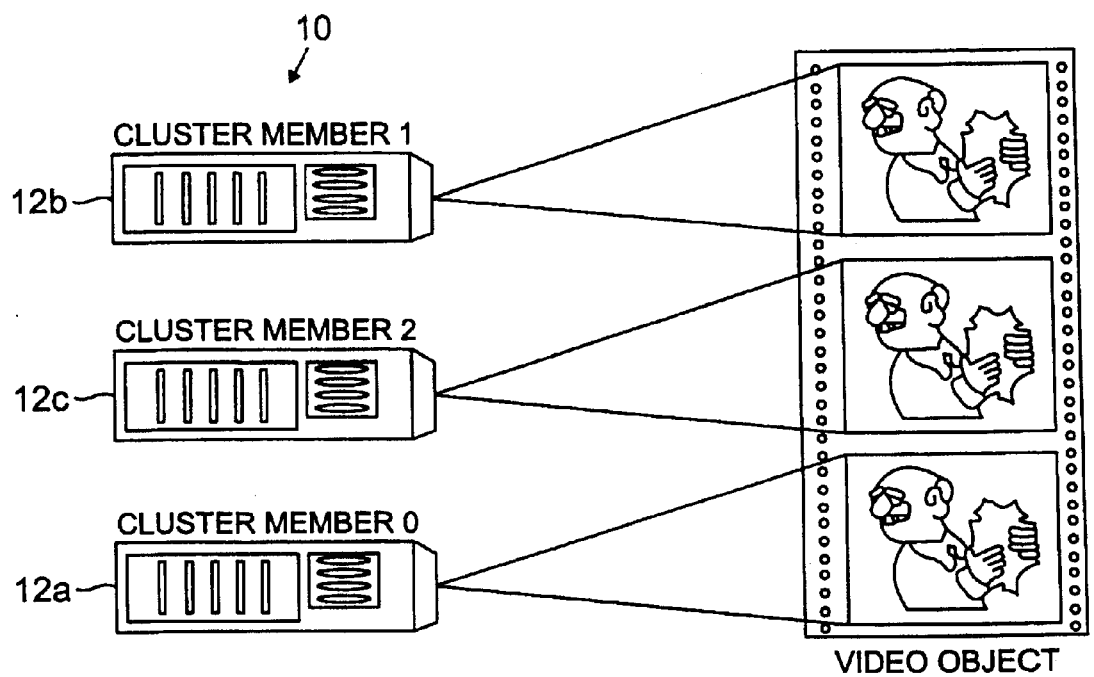
FIG. 3 illustrates an implementation of a striping algorithm used for a three-node cluster system.
FIG. 4 graphically illustrates reading of a video object from the nodes of the cluster system of FIG. 3.

In an implementation, a RAID-5 architecture is used at the system level to provide the redundancy, load balancing, and bandwidth necessary to meet the objectives of the distributive computer system. The cluster computer architecture stores data (typically MPEG video and audio) across the cluster system. When a file is stored in a cluster, the file is fragmented into 64 KB DataBlocks (DataBlocks) and each DataBlock is sequentially written to the nodes in the cluster. The data is organized into "stripe rows", or groups, where N−1 (N is the number of nodes in the cluster system) DataBlocks are EXCLUSIVE-OR'd (XORed) together to create a ParityBlock (ParityBlock). This ParityBlock can be used to recreate any one of the other DataBlocks in the group when it is XORed with the other stripe row members. FIG. 3 illustrates an implementation 40 of the striping algorithm used for a three-node cluster system such as that shown in FIG. 1, wherein each DataBlock and each ParityBlock is 64 Kbytes in size and is sequentially stored on nodes 0, 1 and 2 in a "round robin" manner. The use of ParityBlocks allows the cluster to be able to operate with either N (all) nodes or N−1 nodes (one node missing, referred to as operating in "degraded mode"). When the cluster system is running in degraded mode, such operation is transparent to a consumer because the node failure is masked by using the XOR operation to generate and provide any missing data. The storage penalty for this property increases the size of the file in any one node by 1/N.

FIG. 4 graphically illustrates reading of the DataBlocks of a single video object spread across the members of a cluster. For example, when the cluster is operating in non-degraded mode, to play a video object, a cluster member opens each named fragment file and reads the first block from cluster member 1, the second block from the cluster member 2, and the third block from cluster member 0. Thus, the read algorithm initially skipped node 0 because ParityBlock [0, 1] was not required, and referring to FIG. 3, would next skip node 1 because ParityBlock [2, 3] is not required. If the cluster is operating in degraded mode with, for example, node 1 off-line, then the data stream would be provided by node 0 and node 2 by using the ParityBlocks and the XOR operation to reconstruct the data lost by the failure of node 1. The complexity of this process is hidden from the consumer.

Therefore, in non-degraded mode, 1/Nth of the node's data is read from the local disk subsystem and (N−1)/Nths is read from the remote nodes in the cluster. For example, in the three node cluster of FIG. 1, one third of the data is delivered by the local node disks and two thirds are delivered from the remote cluster nodes. As the size of the cluster increases (more nodes added), a greater percentage of the local node's data comes from the remote nodes. Since all nodes in the cluster are sinking and supplying data simultaneously, every node has the same disk read load. The same considerations apply for writing data to the cluster system.

Although the cluster system can handle any one node failing and still perform without interruption of service, there are other problems. As previously described, data must be striped across the nodes in the cluster to create the fault tolerant property. Therefore, data must be read from the remote nodes across a network link when in operation.

Figure 5:
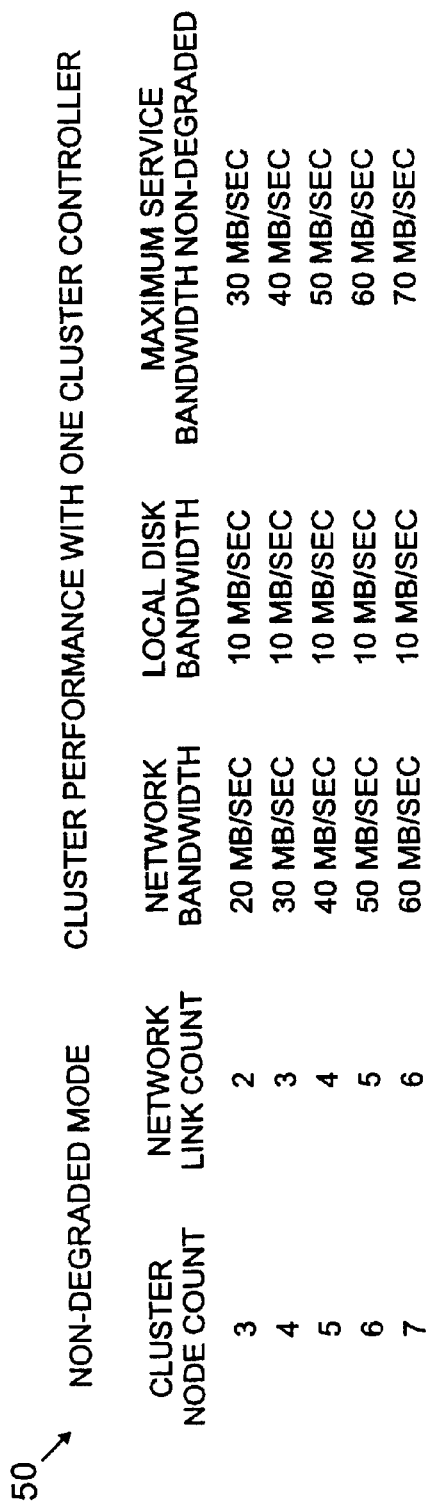
FIG. 5 is a table illustrating the available bandwidth of cluster systems of different sizes operating in non-degraded mode.

As described above, the nodes in a cluster may be interconnected by Fast Ethernet (100 Mb/sec or 10 MB/sec usable) links. In the described cluster implementation of FIG. 1, each node has N−1 links or two links, such that one link is dedicated to each of the other nodes in the cluster. The network bandwidth and the node CPU 20, which manages the transfer of the data across the links 14, are both finite resources in the system. In addition, the smaller the cluster size, the less network bandwidth is available to transfer the data between the nodes, due to the lower number of network links. FIG. 5 is a table 50 illustrating the available bandwidth in a cluster system with one network link interconnecting each node and the system operating in a non-degraded mode with one cluster controller. As shown, the Maximum Service Bandwidth in non-degraded mode increases with the size of the cluster (increase in nodes) due to the additional network links available. Therefore, a node's maximum service bandwidth is limited to the number of nodes times the speed of a single network link or (N* 10 MB/sec) for the described implementation.

It is noted that a cluster could be designed to include multiple cluster controllers per node which would increase the service bandwidth. In addition, other network types (rings, switches) can also be used to achieve high service bandwidths. However, these options incur other costs such as adding hardware, and will not be discussed herein.

Figure 6:
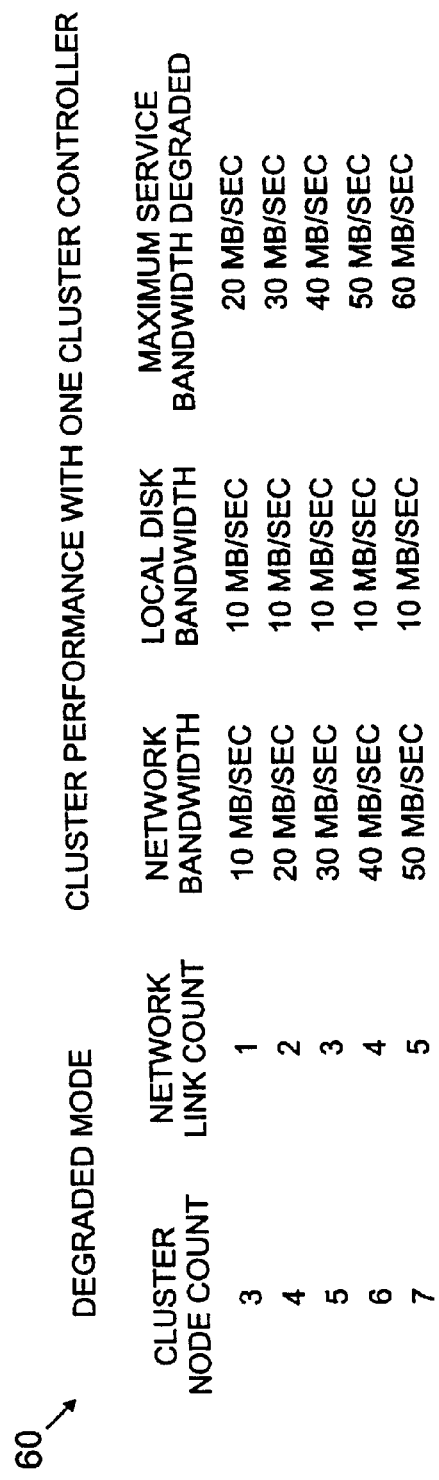
FIG. 6 is a table illustrating the available bandwidth of cluster systems of different sizes operating in degraded mode.

FIG. 6 illustrates the maximum service bandwidth for a degraded cluster system 60. In degraded mode, one node has failed so that the reading node can only read data on (N−2) network links and from its local disk subsystem. Therefore, as shown in FIG. 6, the maximum service bandwidth of a node in a degraded mode cluster system is (N−1) times the speed of a single network link.

As explained above, each time a stripe row is stored on a cluster, the location of the ParityBlock is rotated between the nodes in the cluster. Consequently, if the cluster system is degraded due to failure of a node, this ParityBlock is read and XORed with the other DataBlocks in the stripe row to recreate the missing DataBlock. However, in non-degraded mode, the ParityBlocks have been ignored in the past when reading data. But by applying the same XOR operation when the ParityBlock is stored on the reading node, one remote node can be skipped during the stripe row read process. Since the ParityBlock is read in place of one of the remote DataBlocks, less network bandwidth is consumed for the stripe row read operation since the DataBlocks does not have to be provided over an interconnecting channel 14. During non-degraded mode, it is preferable to skip a different node each time the ParityBlock is used to replace a remote DataBlock read operation so that the cluster system is balanced. In addition, if one of the nodes fails, then the method must be disabled because all of the remaining DataBlocks and ParityBlocks, including those on remote nodes, must be used to recreate missing data.

FIG. 7 is a table 70 comparing the cluster local read to remote read data source percentages when the ParityBlock is not used, and when it is used with the XOR operation to skip one remote node during read operations, for different cluster configurations of three to seven nodes. Shifting the remote read to the local ParityBlock and using the XOR operation changes the local to remote data source ratio from 1/Nth local and (N−1)/N remote to 1 (N−1) local and (N−2)/(N−1) remote. It is thus apparent that less data is required from remote cluster nodes when operating in non-degraded mode and using the XOR operation with the local ParityBlocks. Since less data is required from the remote cluster nodes (best case being the 3 node cluster configuration illustrated in FIG. 1) for the same service load, the network bandwidth required is also reduced. The earlier analysis showed that the network links limited the maximum service bandwidth. Now that the network bandwidth is reduced, more data can be transferred and a greater service load can be delivered. For example, in a three node cluster, the maximum service bandwidth is increased from 30 MB/sec to 40 MB/sec, which is an increase of 33% using the same equipment and utilizing the XOR engine which had been idle in the non-degraded mode.

FIG. 8 shows the maximum service bandwidth for different cluster sizes with one cluster controller when the XOR read algorithm is applied. It should be noted that as the cluster node count increases, the ratio of DataBlocks to ParityBlocks decreases, which somewhat reduces the benefits obtained from performing the read operation utilizing the ParityBlocks and XOR algorithm.

Therefore, parity information and XOR operations can be traded off against network bandwidth in a non-degraded cluster system. Parity data is required in case a node in the cluster fails, and as described above, it can also be used to create data stored on remote nodes to remove the requirement to read the data from one more of the remote nodes, and thus reduce network bandwidth.

It will be understood that various modifications of the invention may be made without departing from the spirit and scope of the invention. Accordingly, other embodiments are within the scope of the following claims.

What is claimed is:

1. A method for increasing service bandwidth in a cluster system having at least three nodes comprising:

storing data input according to a distributed, redundant storage process with data stored at each node and a portion of a redundant representation of the data stored at each node;

skipping one remote node when redundant data is stored on a reading node and there has not been a failure of any of the nodes; and reading data from the cluster system using a stripe row read process by applying an XOR operation to the redundant portion stored on the reading node.

2. The method of claim 1 further comprising skipping a different node each time the XOR operation is used to balance the read operation.

3. The method of claim 1 wherein each portion of the redundant data is stored in a round-robin manner in each node of the cluster system.

4. The method of claim 1 further comprising disabling the method if one of the nodes fails.

5. A method for operating a cluster system having at least three nodes to increase the service bandwidth when operating in a non-degraded mode comprising:

storing data input according to a distributed, redundant storage process with data stored at each node and a portion of a redundant representation of the data stored at each node;

skipping one remote node when redundant data is stored on a reading node; and reading data from the cluster system using a stripe row read process by applying an XOR operation to the redundant portion stored on the reading node.

6. The method of claim 5 further comprising skipping a different node each time the XOR operation is used to balance the read operation.

7. The method of claim 5 wherein each portion of the redundant data is stored in a round-robin manner in each node of the cluster system.

8. An article comprising a computer readable medium which stores computer executable instructions for increasing the service bandwidth of a computer clister system that includes at least three nodes, the instructions causing the cluster system to:

store data input according to a distributed, redundant storage process so that data is stored at each node and a portion of a redundant representation of the data is stored at each node;

skip one remote node when redundant data is stored on a reading node and none of the nodes has failed; and read data from the cluster system using a stripe row read process by applying an XOR operation to the redundant portion stored on the reading node.

9. The article of claim 8, the instructions further causing the cluster system to skip a different node each time the XOR operation is used to balance the read operation.

10. The article of claim 8, the instructions causing each portion of the redundant data to be stored in a round-robin manner in each node of the cluster system.

11. The article of claim 8, the instructions further causing the method to be disabled if one of the nodes fails.

* * * * *